US012275598B2

(12) United States Patent
Hogan et al.

(10) Patent No.: US 12,275,598 B2
(45) Date of Patent: Apr. 15, 2025

(54) SYSTEM AND METHOD FOR TRACKING A MOVING ELEMENT IN A CONVEYOR SYSTEM

(71) Applicant: ATS Automation Tooling Systems Inc., Cambridge (CA)

(72) Inventors: Roger Hogan, Cambridge (CA); Steve Aikens, Cambridge (CA); John Ditner, Cambridge (CA); Albert Kleinikkink, Cambridge (CA)

(*) Notice: Subject to any disclaimer, the term of this patent is extended or adjusted under 35 U.S.C. 154(b) by 65 days.

(21) Appl. No.: 17/948,439

(22) Filed: Sep. 20, 2022

(65) Prior Publication Data

US 2023/0092195 A1    Mar. 23, 2023

Related U.S. Application Data

(60) Provisional application No. 63/246,071, filed on Sep. 20, 2021.

(51) Int. Cl.
*B65G 43/00* (2006.01)
*B65G 25/00* (2006.01)

(52) U.S. Cl.
CPC .............. *B65G 43/00* (2013.01); *B65G 25/00* (2013.01)

(58) Field of Classification Search
None
See application file for complete search history.

(56) References Cited

U.S. PATENT DOCUMENTS

| | | | |
|---|---|---|---|
| 7,781,993 B1 | 8/2010 | Faizullabhoy et al. | |
| 8,397,896 B2 * | 3/2013 | Kleinikkink | B23Q 7/1447 |
| | | | 198/747 |
| 8,789,678 B2 * | 7/2014 | Kleinikkink | B65G 35/066 |
| | | | 198/747 |

(Continued)

FOREIGN PATENT DOCUMENTS

| | | |
|---|---|---|
| EP | 2403784 A1 | 1/2012 |
| EP | 2980665 A2 | 2/2016 |

(Continued)

OTHER PUBLICATIONS

Extended European Search Report, European Patent Office, corresponding Europe Application No. 22196485.1, dated Feb. 13, 2023.

*Primary Examiner* — Kavel Singh
(74) *Attorney, Agent, or Firm* — Amarok IP Inc.; Neil W. Henderson

(57) ABSTRACT

A system and method for tracking a location of a moving element on a conveyor system. The system including: magnetic sensors; a magnetic encoder strip that is readable by the magnetic sensors; and a processor for receiving and processing the sensor readings to determine a location of the moving element. The method including: sensing a current location of the moving element, wherein at least one of the magnetic sensors and magnetic encoder are associated with the moving element; and providing a current location to a conveyor system controller. The system may further include: color sensors; and a color gradient encoder strip that is readable by the color sensors, wherein the color gradient encoder strip and color sensors provide moving element location at start up and the magnetic sensors and magnetic encoder strip track moving element location during operation. In this case, the method is adjusted accordingly.

8 Claims, 17 Drawing Sheets

(56) References Cited

U.S. PATENT DOCUMENTS

| | | | |
|---|---|---|---|
| 9,096,386 B2 * | 8/2015 | Staunton | B23Q 7/1447 |
| 9,246,510 B2 * | 1/2016 | Mansour | H04L 1/0058 |
| 9,684,006 B2 * | 6/2017 | Pollack | G01N 35/04 |
| 9,923,444 B2 * | 3/2018 | Kleinikkink | H02K 41/03 |
| 10,670,079 B2 * | 6/2020 | Kleinikkink | H02K 41/031 |
| 10,974,914 B2 * | 4/2021 | Kleinikkink | B65G 54/02 |
| 11,205,979 B2 * | 12/2021 | Li | H02P 5/50 |
| 2020/0232826 A1 | 7/2020 | Smit et al. | |

FOREIGN PATENT DOCUMENTS

| | | | |
|---|---|---|---|
| EP | 3072836 A1 | 9/2016 | |
| EP | 3027542 B1 | 8/2018 | |
| WO | 2021164632 A1 | 8/2021 | |

* cited by examiner

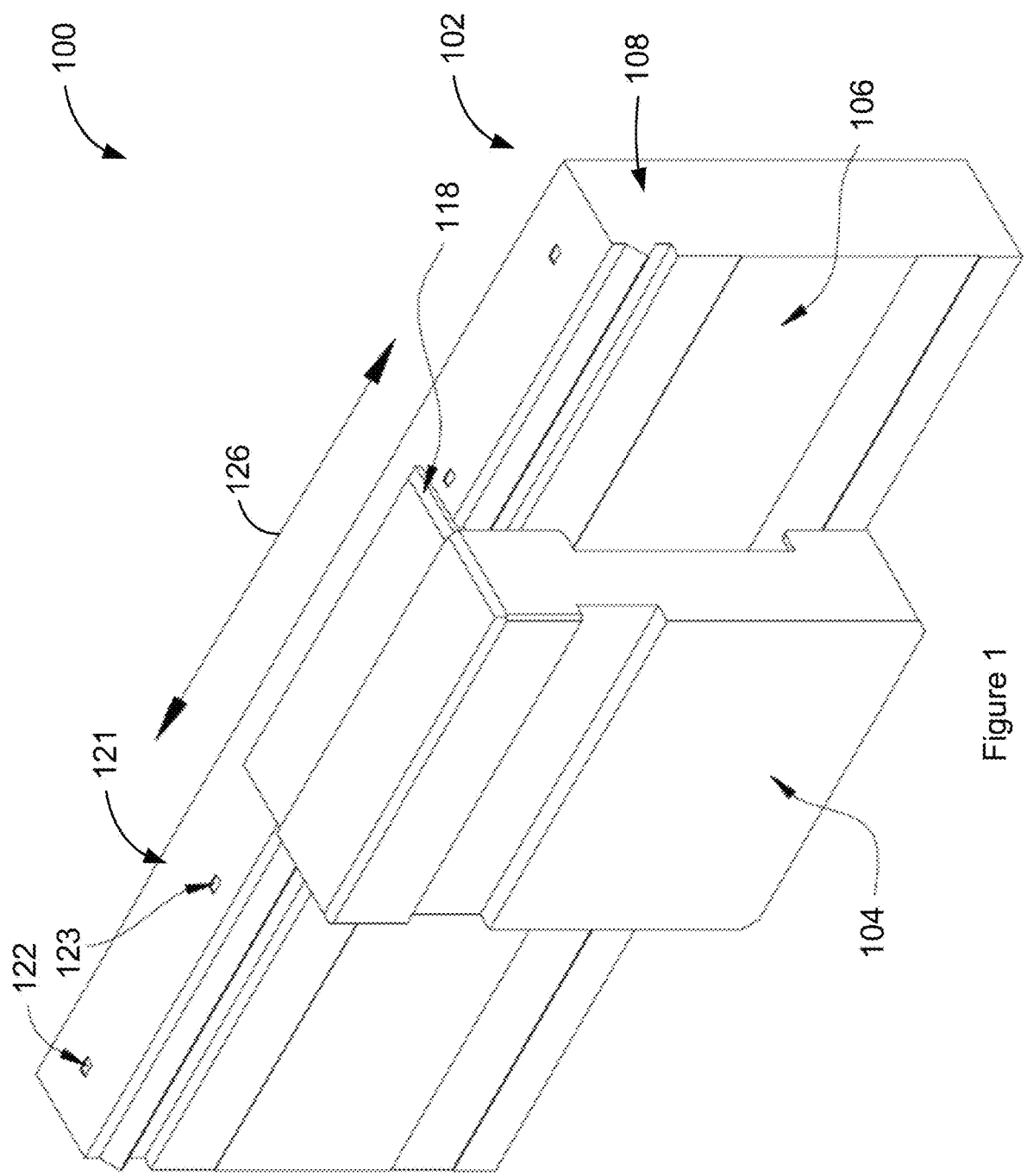

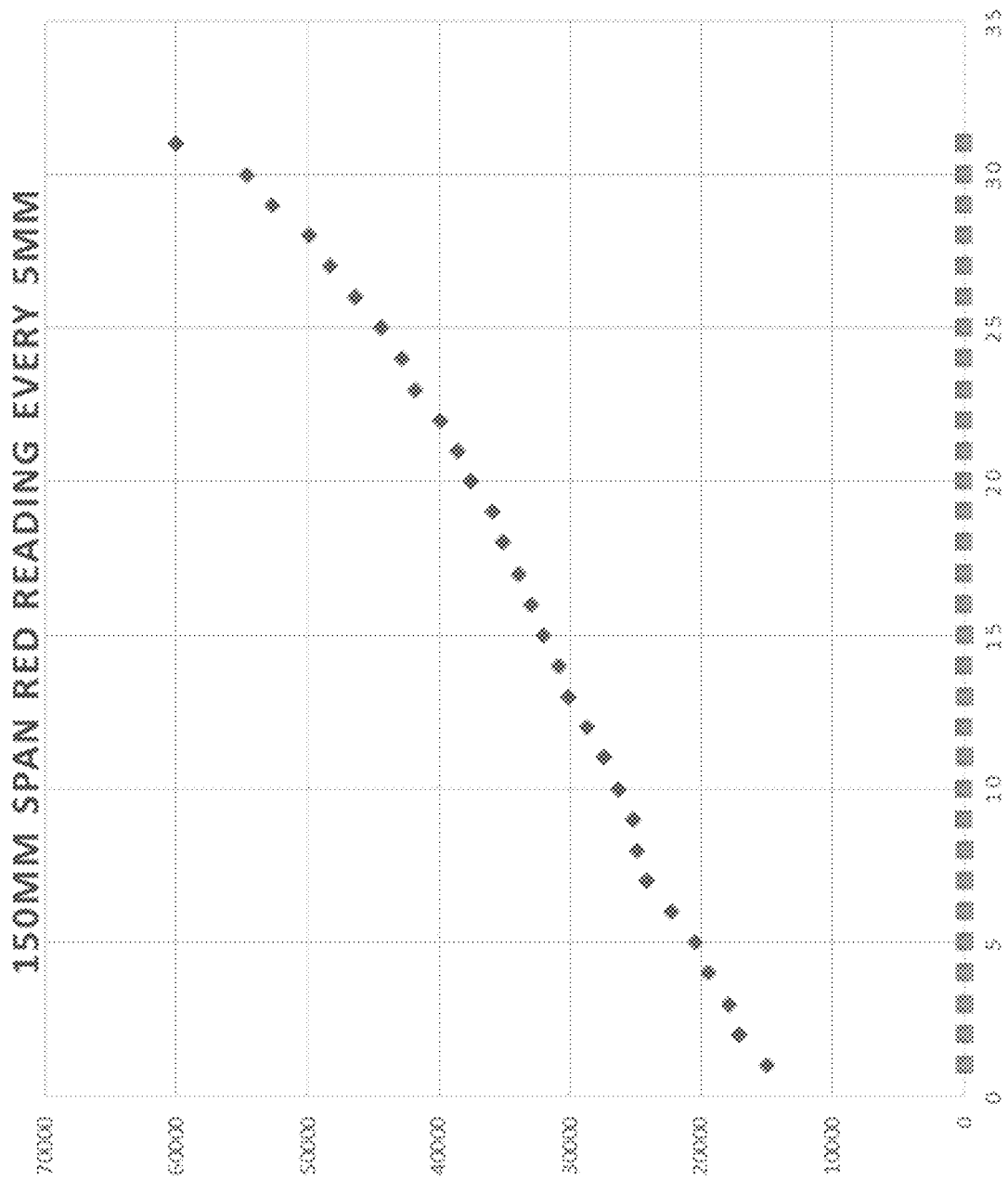

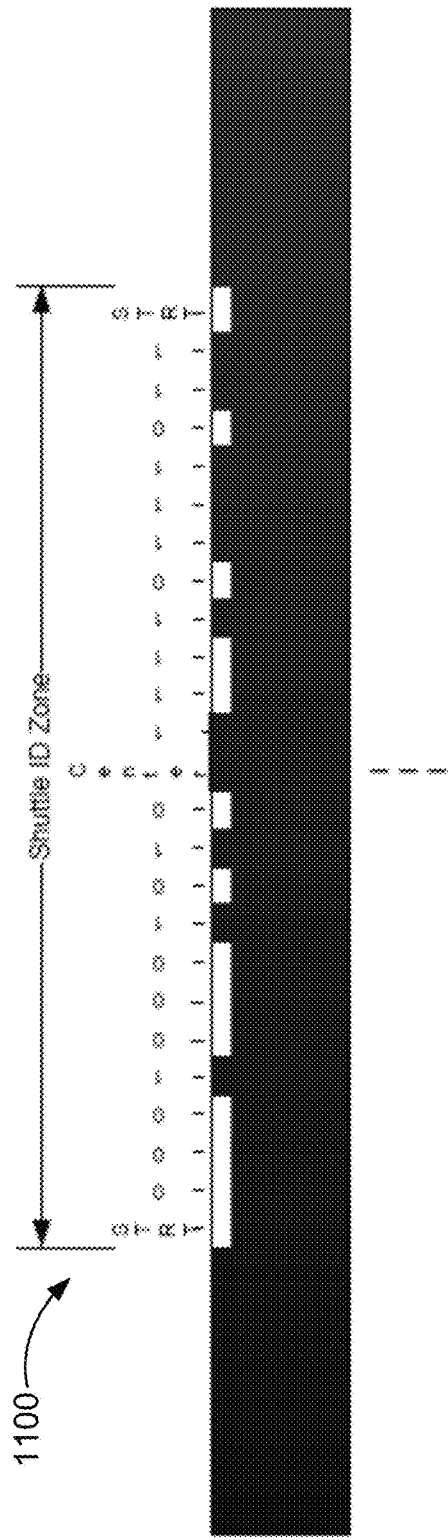
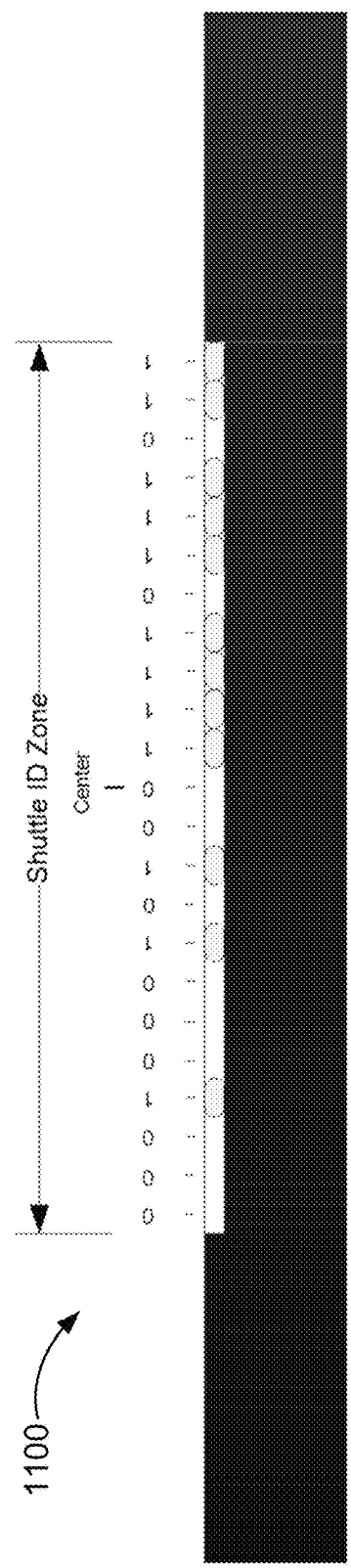
Figure 11A
Figure 11B

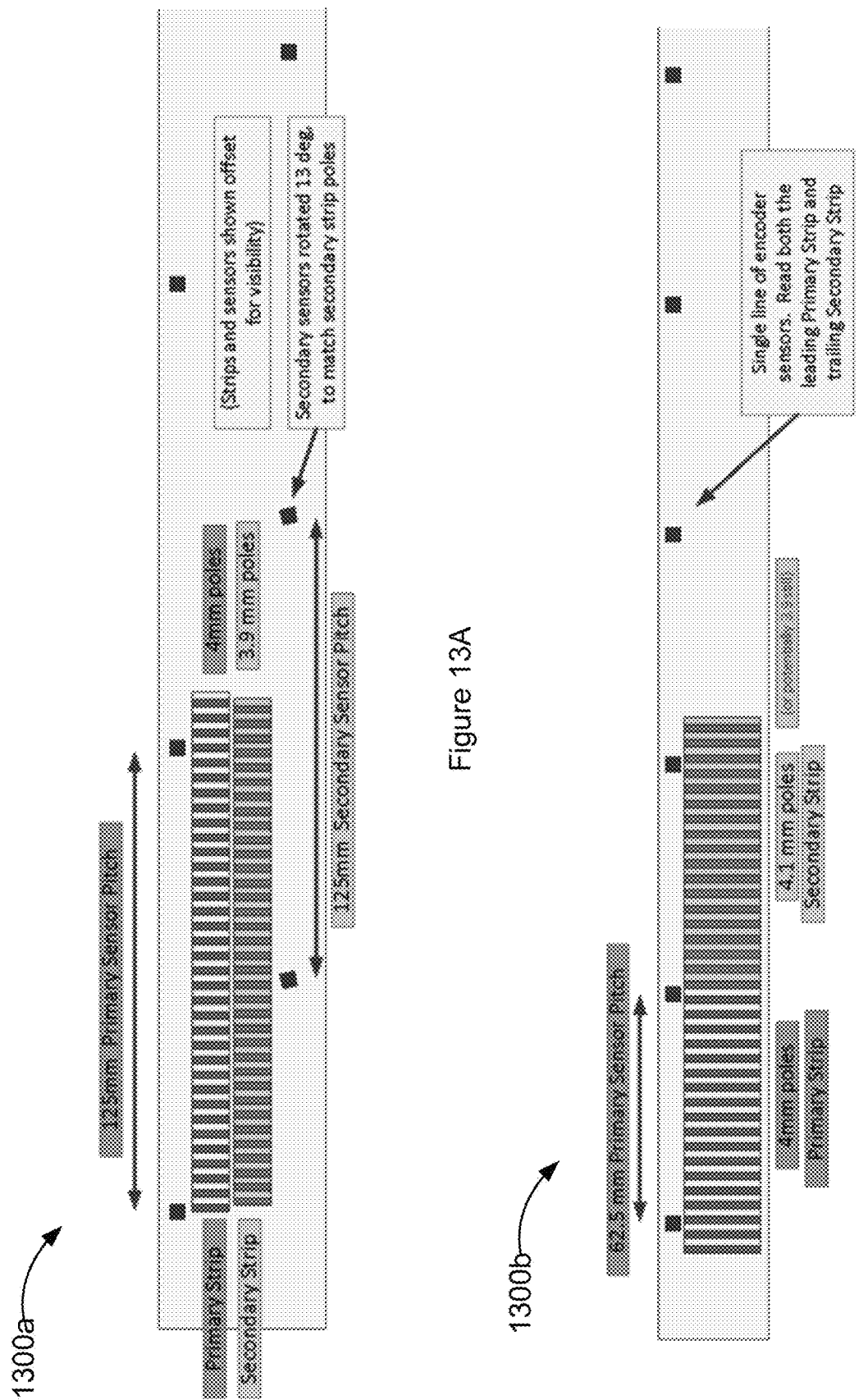

SYSTEM AND METHOD FOR TRACKING A MOVING ELEMENT IN A CONVEYOR SYSTEM

FIELD

The present disclosure generally relates to systems and methods for tracking a moving element in a conveyor system, and more specifically to tracking moving elements in a linear motor conveyor system using an encoder.

BACKGROUND

In manufacturing, it may be desirable to track position and/or identity of moving elements, pallets, fixtures, products or the like. Based on this tracking, a manufacturing system can track process data, performance data, product genealogy, detect errors, and the like. Manufacturing systems can also report status, make routing decisions, select assembly options and the like.

In modern manufacturing environments, and particularly those involving linear motor conveyors, pallets or moving elements carrying parts on a conveyor system or the like can move at high speeds and with high acceleration. In some cases, the moving elements may be independently driven. As such, it can be difficult to track their position accurately. Further, it can be useful to assign a unique identifier or "ID" to a specific item or a pallet/moving element associated with an item but this ID must also be tracked as the moving element moves through the manufacturing environment. Examples of existing ID tracking systems in manufacturing include stationary radio frequency (RF) read/write heads with RF tags mounted on the items being tracked, barcode scanners with barcode labels fastened to the items being tracked, and vision cameras reading a unique identification code on the item with optical character recognition (OCR).

There are limitations with conventional conveyor tracking systems. For example, if readers for the position or ID are bumped or shifted, it could lead to failures due to misalignment or excessive gaps. Readers based on optics may be prone to faults due to dirt or an inability to read poor labels. Tags that rely on battery power may be prone to failure when batteries run low. Provisions may need to be made on systems to handle invalid reads. In certain conventional tracking systems, added hardware may be required to be incorporated into the system.

For ID tracking, firstly, conventional ID readers do not generally provide the location of the item along with the ID that is read. Secondly, in certain conventional ID tracking systems, the ID is only available at stationary readers and not at all positions/times along the path an item is travelling. Thirdly, conventional ID readers can cause delays in a system because the item may have to slow down or stop in front of the reader when the ID is being read. Fourthly, in conventional ID systems, there may need to be physical access to a tag or the like for a reader to be able to read it. Also, the readers will generally occupy physical space for mounting on the system.

There are also certain limitations to conventional position feedback/tracking systems. For example, to control and move a pallet on a linear motor based conveyor, the position of each pallet is provided to a controller that precisely controls the pallet movement. This position feedback generally needs to be of a high resolution and a high speed. An example of an existing position feedback system used in manufacturing is magnetic readers that read magnetic fields of magnets placed on the pallet or carrier in the form of a magnetic strip or the like. Conventional position feedback systems may be limited by only providing position of pallets or carriers so their movements can be controlled. Conventional systems may control multiple pallets, using the real time position feedback, but, added hardware may be required to track the specific pallet or fixture number that is generally needed for ID tracking.

In the case of a standalone identification reader, it is advantageous to know the precise position of the item along with the unique identifier. Operations or tasks can better be performed when the precise location of the item is known. Take the example of a robot performing an assembly operation on a product in a manufacturing cell. With a unique identification tracking code, the system can determine what operations need to be performed by the robot on the product. If the location of the product is included along with its identification tracking code, the robot would know precisely where the product is located to start working on the product.

In the case of a linear motor conveyor, there is generally some method to track the location of all pallets but the resolution and accuracy of conventional systems can be improved.

As such, there is a need for improved moving element tracking systems and methods in conveyor systems.

SUMMARY

It is an object of embodiments of the systems and methods herein to overcome or mitigate at least one disadvantage of previous systems.

According to an aspect herein, there is provided a system for tracking a location of a moving element on a conveyor system, the system including: a plurality of magnetic sensors; a magnetic encoder strip that is readable by the magnetic sensors; and a processor for receiving and processing the sensor readings to determine a location of the moving element on the conveyor system.

In some cases, the system may further include: a plurality of color sensors; and a color gradient encoder strip that is readable by the color sensors, wherein the color gradient encoder strip and color sensors provide moving element location at start up and the magnetic sensors and magnetic encoder strip track moving element location during operation.

In some cases, the system may further include an illumination light emitting diode (LED) lighting an area associated with one or more of the plurality of color sensors and wherein the processor is configured to turn the illumination LED on and off.

In some cases, the magnetic encoder strip may include a primary and a secondary encoder strip arranged in series and each of the primary and secondary encoder strips have different pitch.

In some cases, the magnetic encoder strip or the color gradient encoder strip may include a moving element identification section and a position tracking section.

In some cases, the magnetic sensors are Hall effect sensors.

In some cases, the system may include a second magnetic encoder strip wherein the second magnetic encoder strip is configured using a quasi-Gray code. This can, for example, assist with determining/sensing the initial location of the moving elements on start-up and assist with tracking on curved tracks. In this case, the second magnetic encoder strip may be configured as approximately half the length of the magnetic encoder strip.

According to another aspect herein, there is provided a method for tracking a location of a moving element on a conveyor system, the method including: sensing a current location of the moving element using a processor and magnetic sensors configured to sense a magnetic encoder strip, wherein at least one of the magnetic sensors and magnetic encoder are associated with the moving element; and providing a current location to a conveyor system controller.

In some cases, the current location may include an initial location at conveyor system start up or an updated location during conveyor system operation and the sensing a current location may then include: sensing an initial location of a moving element using the processor and a plurality of color sensors configured to sense a color gradient encoder; and sensing for an updated location of the moving element using the processor and a plurality of magnetic sensors configured to sense a magnetic encoder In this case, the method may include illuminating an area associated with one or more of the plurality of color sensors and turning the illumination on or off when sensing with the associated one or more of the plurality of color sensors. In some cases, the method may include sensing with the illumination on and off and preparing a result based on both sensor results.

In some cases, the method may further include tracking moving element identification using at least one of the plurality of color sensors and the plurality of magnetic sensors.

In some cases, the method may further include configuring the magnetic encoder strip to have a primary and a secondary encoder strip arranged in series and each of the primary and secondary encoder strips have different pitch.

In some cases, the method may include sensing a current location using a second magnetic encoder strip configured with a quasi-Gray code.

According to another aspect herein, there is provided a system and method for tracking a moving element in a conveyor system including the use of a color gradient encoder strip for locating moving elements at start up of the conveyor.

According to another aspect herein, there is provided a system and method for tracking a moving element in a conveyor system including the use of a plurality of sections on an encoder strip for tracking moving elements. In particular, there may be a primary and a secondary encoder strip arranged in series.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 1 is a track section of a conveyor system with a moving element;

FIGS. 7A and 7B are identification sections of a machine readable medium;

FIG. 10 illustrates sensor readings on a color gradient encoder according to an embodiment herein;

FIGS. 11A and 11B illustrate a shuttle/moving element identification (ID) zone of an encoder according to an embodiment;

FIGS. 13A and 13B illustrate another embodiment of a system for tracking a moving element.

DETAILED DESCRIPTION

Figure 2A:
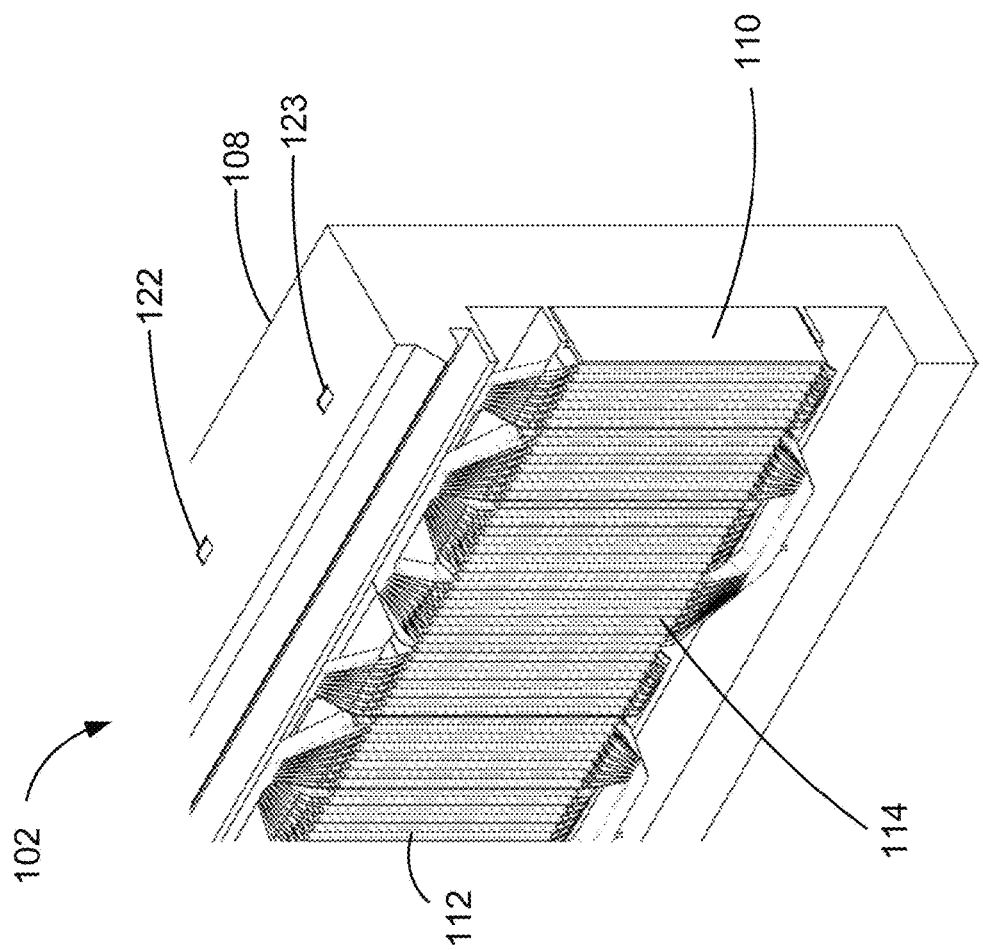
FIG. 2A is a perspective view of the track section of FIG. 1 having a cover removed to show a linear drive mechanism.

Generally, the present disclosure provides a method and system for tracking position of a moving element in a conveyor system. In some cases, the method and system include integrated identification tracking and real-time position feedback.

FIG. 1 illustrates a conveyor system 100 having a track section 102. The track section 102 includes one or more moving elements 104 (only one is illustrated) which are configured to ride or travel along a track 106 of the track section 102. The track 106 includes a frame 108 configured to support the moving element 104. Some of the principles of operation of a similar track section are described in more detail in U.S. Pat. No. 8,397,896 to Kleinikkink et al., which is hereby incorporated herein by reference. In this particular case, the conveyor system is a linear motor conveyor system The conveyor system 100 can be composed of a plurality of track sections 102 which are mechanically self-contained and quickly and easily separable from one another so as to be modular in nature. In this modular example, the track sections 102 are mounted on a support (not shown) so as to align and abut one another in order to form a longer track. In order to be modular, each track section 102 may house self-contained electronic circuitry for powering and controlling the track section 102 and/or the moving element 104. The conveyor system 100 may also include curvilinear track sections 102.

Figure 2C:
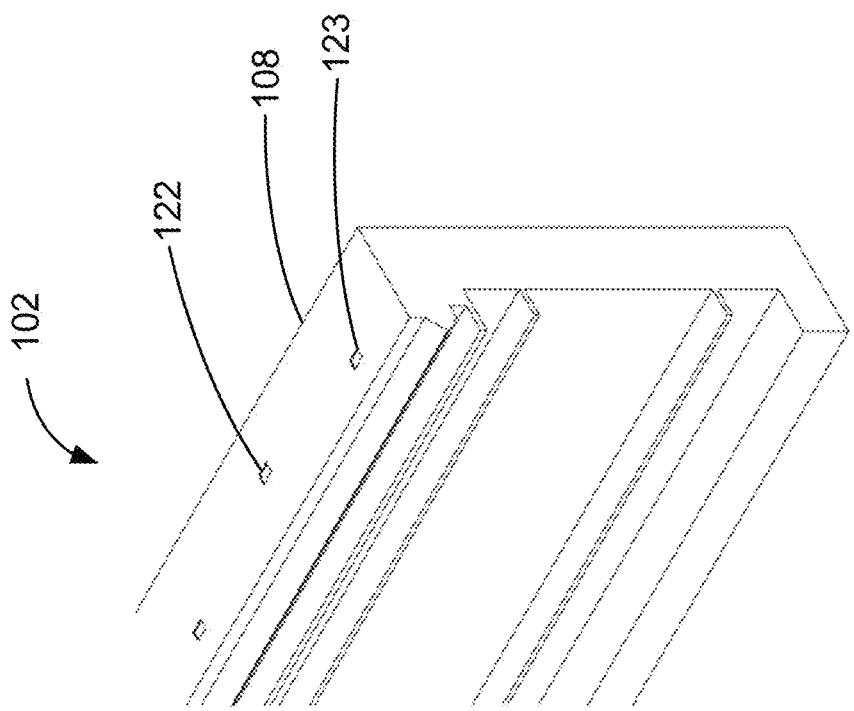
FIG. 2C is a perspective view of the track section of FIG. 1 with the linear drive mechanism removed.
Figure 2B:
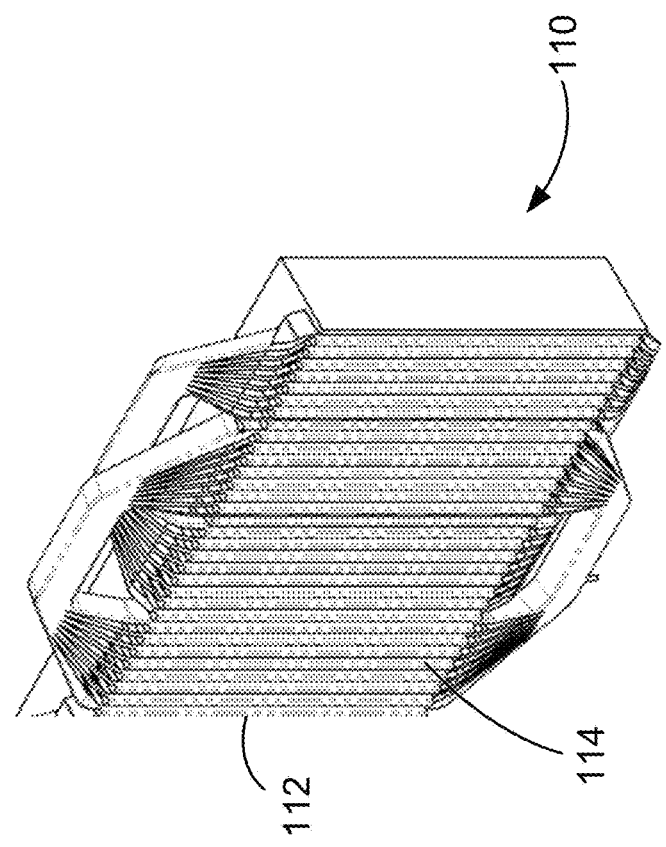
FIG. 2B is a perspective view of a linear drive mechanism of the track section of FIG. 1.

FIG. 2A illustrates a perspective view of the track section 102 showing the interior. FIGS. 2B and 2C illustrate an exploded view of the interior of the track section 102. The track section 102 includes the frame 108 that houses a linear drive mechanism 110. The linear drive mechanism 110 is formed as a stator armature 112 including a plurality of embedded coils 114. The embedded coils 114 can be individually excited so that an electrically-induced magnetic flux produced by the stator armature 112 is located adjacent to a given moving element 104 to be controlled, in a direction normal thereto, without affecting nearby moving elements 104. The motive force for translating each moving element 104 arises from the magnetomotive (MMF) force produced by elements 124, such as permanent magnets, provided to each moving element 104 (shown in FIG. 5) and the stator armature 112, i.e., by the tendency of the corresponding magnetic fluxes provided by the stator armature 112 and moving element 104 to align or mis-align. A controller (described below) enables separate and independent moving MMFs to be produced along the length of the track section 102 for each moving element 104 so that each moving element 104 can be individually controlled with a trajectory profile that is generally independent of any other moving element 104. Structurally, the track section 102 may thus be broadly classified as a moving-magnet type linear brushless motor having multiple moving elements 104.

Referring again to FIG. 1, each moving element 104 includes an extension 118 provided with a machine readable medium 120 (shown in FIG. 5B), which may be, for example, a magnetic strip, an optically transmissive or reflective strip, other type of feedback system or the like. The extension 118 is configured such that the machine readable medium 120 interacts with sensors 122, 123 provided to the track 106. The sensors 122, 123 are configured to read the machine readable medium 120, whether magnetically, optically, or otherwise. The machine readable medium 120 and sensors 122, 123 form a position sensing system 121. The position sensing system 121 may be arranged such that the position sensing system 121 is protected from traffic on the track section 102 and dust and other debris. The position sensing system 121 is employed in the moving element identification and position-detecting subsystem (described in further detail below).

In the illustration of FIG. 1, the sensors 122, 123 are located on the track section 102 and the machine readable medium 120 is located on the moving element 104. In an alternative, the sensors 122, 123 may be located on the moving element 104 and the machine readable medium 120 may be located on the track section 102. The sensors 122, 123 can also be configured to read an identifier of the moving element 104 from the machine readable medium 120. The sensors 122, 123 are configured to read a position of the moving element 104 on the track section 102 from the machine readable medium 120.

Figure 3:
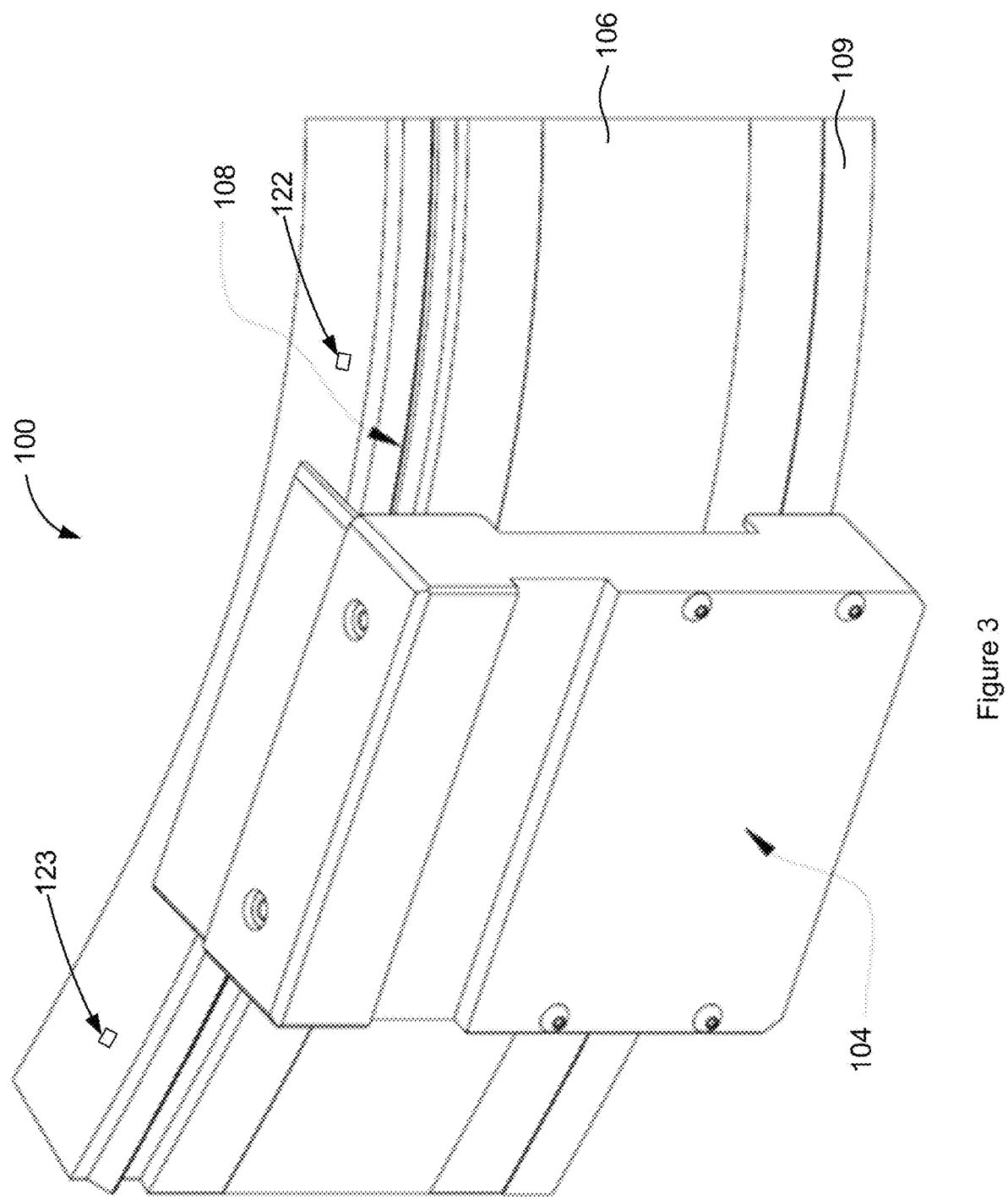
FIG. 3 is a perspective view of a conveyor system having a curved track section.

FIG. 3 illustrates a conveyor system 100 having a curvilinear profile, in accordance with a further embodiment. Where the track section 102 is curvilinear, the sensors 122, 123 can be positioned along the curvilinear profile such that the machine readable medium 120 can be read by the sensors 122, 123 and the readings can then be translated from the curvilinear profile to a linear profile, using linear units such as microns, for the purposes of feedback control. Control of the moving element 104 can then occur in the linear profile/linear units to allow for simplified calculation in a similar way as for linear track sections.

Figure 4:
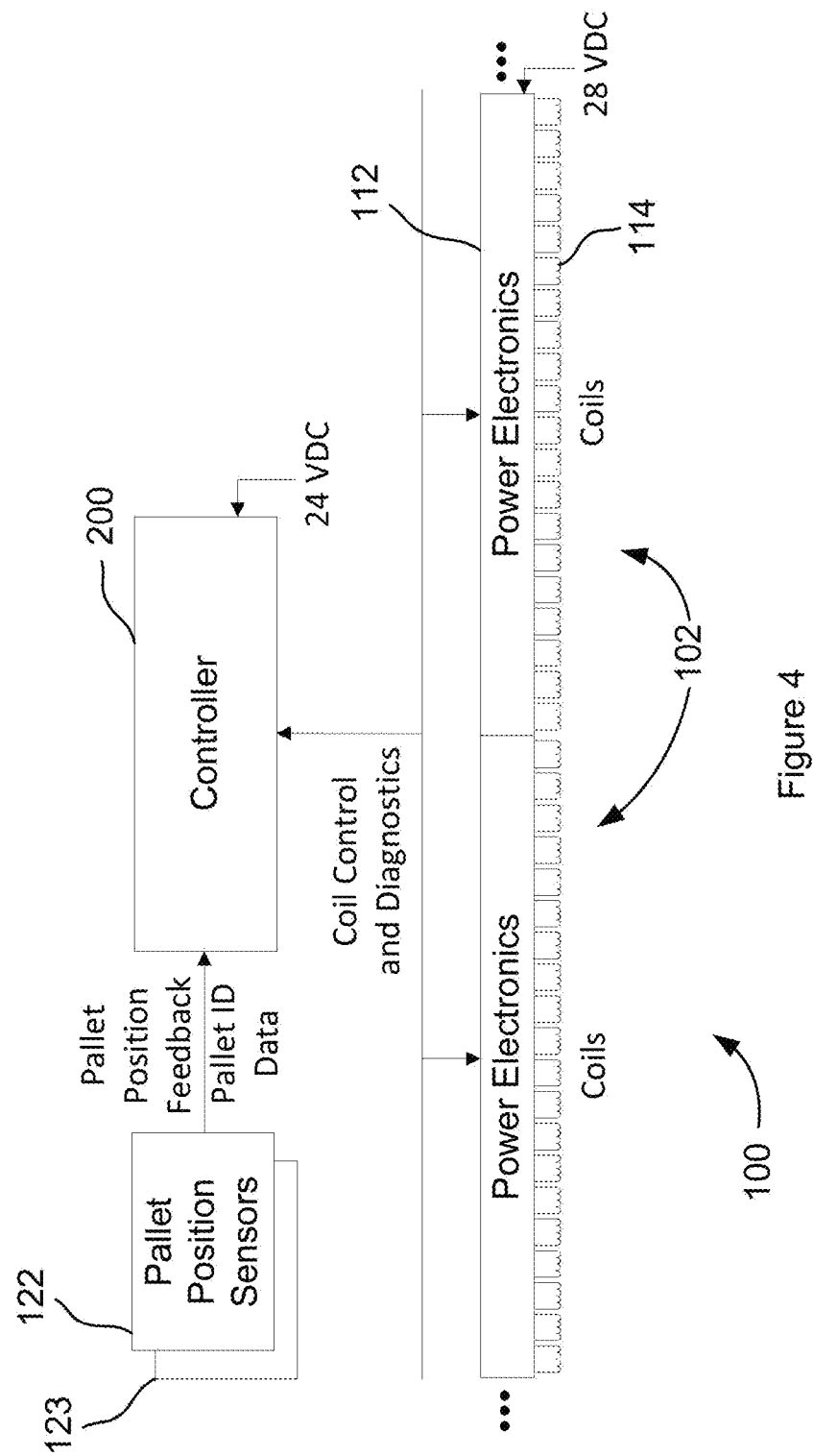
FIG. 4 is a is a block diagram of an example control architecture employed in the conveyor system.

FIG. 4 is a block diagram of an example control architecture employed in the conveyor system 100. Controller 200 controls the conveyor system 100 and the track sections 102. The controller 200 is configured to monitor the position of and control the movement of moving elements 104 based on the position. The controller 200 may also monitor and report moving element identification data so the moving element identifier is known and can be tracked throughout the conveyor system 100. As such, the controller 200 may be used for process (i.e. manufacturing-line) control. The controller 200 may also provide a supervisory diagnostic role by monitoring the track sections 102 (e.g., by engaging in a continuous polling or pushing process) in order to determine the current status of any track section 102 and whether any track section 102 has failed. It will be understood that, in some cases, the controller 200 may directly control each of the track sections 102.

The controller 200 may also be connected to other devices, such as programmable logic controllers (PLCs) (not shown) via input/output (I/O) or network modules. The PLCs may provide manufacturing-line station-processing instructions to the track section 102, such as directing the next destination for a moving element 104 along the track 106, or providing station-specific motion instructions in respect of a given moving element 104.

As illustrated, the controller 200 is connected to the stator armature 112 and coils 114 in the track sections 102 and controls the coils 114 in accordance with an independent trajectory or "move" command for each moving element 104 located therein.

The controller 200 is also connected to the sensors 122, 123 situated in the track section 102. The controller 200 is configured to implement a closed-loop digital servo control system that controls movement of the moving element 104 by resolving the real-time position of each moving element 104 located in the track section 102. The controller 200 makes use of the position sensing system 121, which supplies moving element identification data and moving element position data to the controller 200. When the machine readable medium 120 of a given moving element 104 moves over a given sensor 122, 123, moving element position feedback is transmitted to the controller 200. The controller 200 decodes the moving element position feedback to determine the position of the moving element 104.

The controller 200 provides processing for sampling the sensors 122, 123 and resolving the position of each moving element 104 located in the associated track section 102. Broadly speaking, the processing associates the machine readable medium 120 of any given moving element 104 with the identified sensor 122, 123 at any time so that the position of the given moving element 104 can be calculated based on a fixed position of the associated sensor 122, 123 and a relative position of the machine readable medium 120 in relation to the associated sensor 122, 123. In addition, when the machine readable medium 120 simultaneously engages a plurality of sensors 122, 123, the processing transfers or hands-off the association or "ownership" of the moving element 104 from the current sensor 122, 123 to an adjacent engaged sensor 122, 123. In this manner, the position of an identified moving element 104 can be continuously tracked.

Those skilled in the art will appreciate that the position sensing system 121 may be magnetic, optical, color optical, capacitive, or may be another alternative system. For example, the machine readable medium can be a magnetic strip and the sensors 122, 123 can be corresponding magnetic detectors. Such an embodiment may provide very fine resolution. In some cases the machine readable medium can be configured to provide 1 micron or better resolution. The position accuracy of the moving element 104 is aided by the resolution of the position sensing system 121.

With optical machine readable media, signals are typically only generated when there is movement. The controller 200 counts up or down in accordance with the direction of travel of the moving element 104. Magnetic machine readable media may produce a position reading whether the moving element 104 is moving or not as magnetic detectors may detect a strength of a magnetic field on the machine readable medium to allow additional information on position even if the moving element 104 is not moving.

Figure 5A:
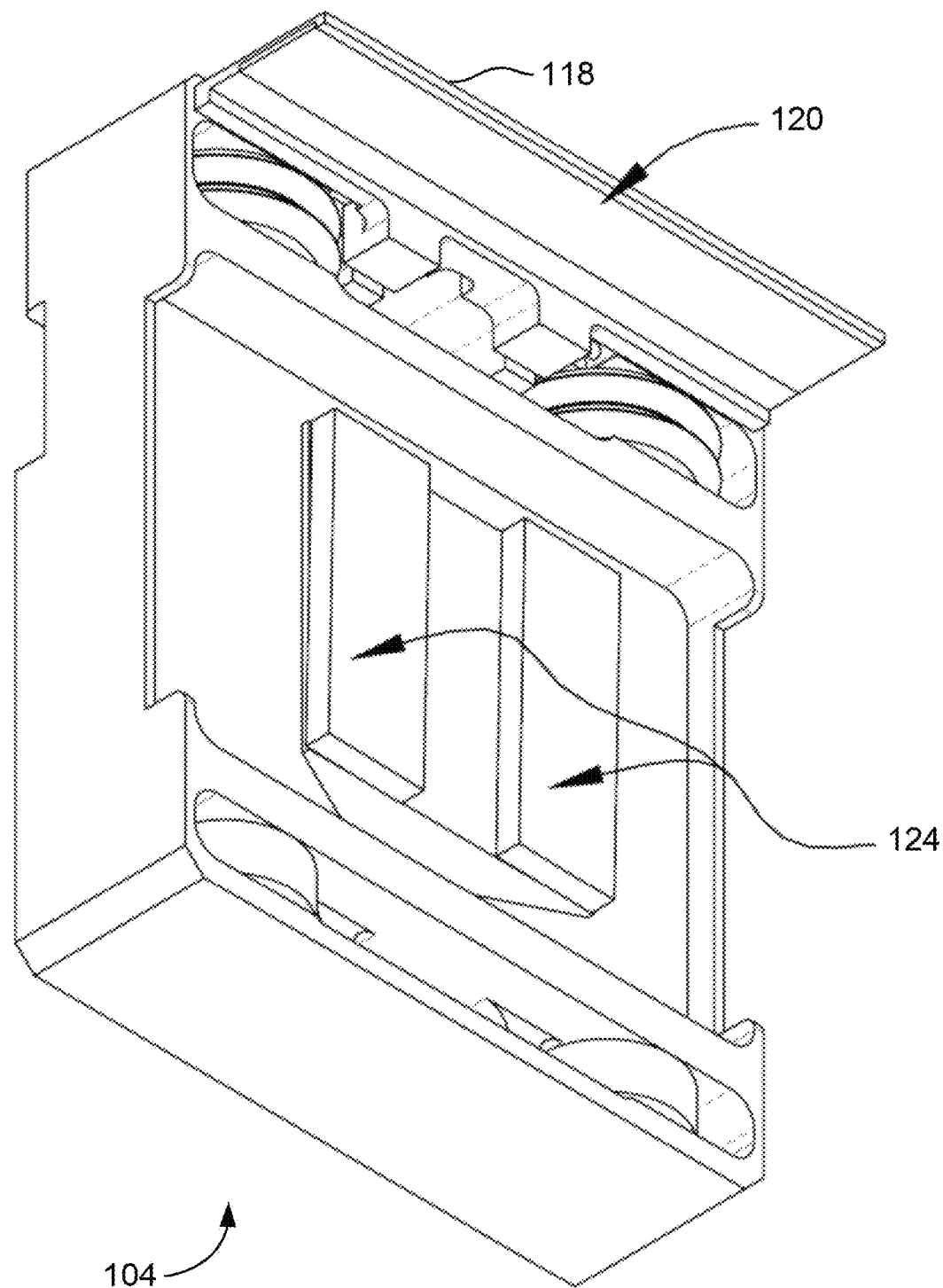
FIG. 5A is a rear view of the moving element having a machine readable medium.
Figure 5B:
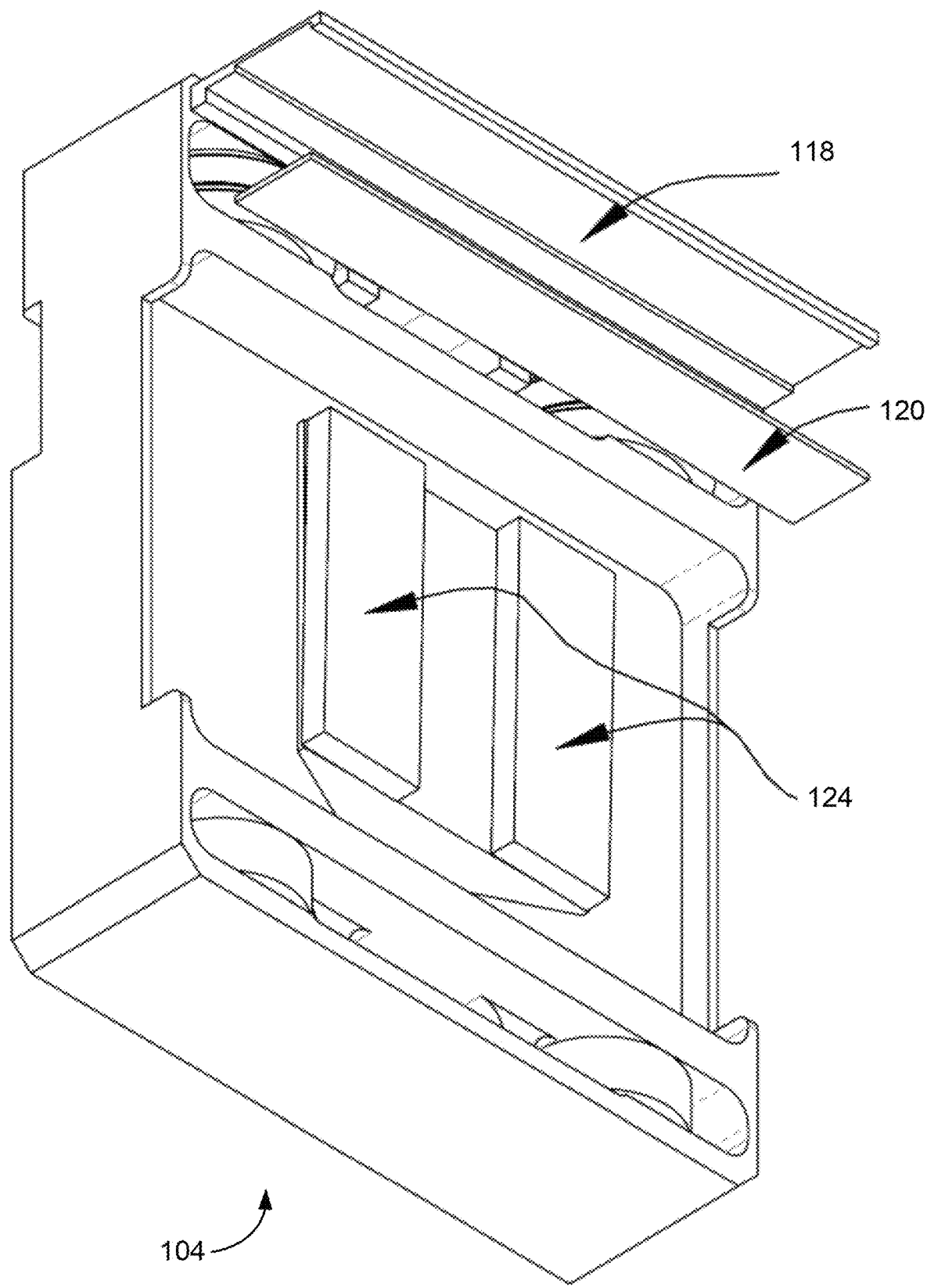
FIG. 5B is an exploded rear view of the moving element with the machine readable medium removed.

FIGS. 5A and 5B show a moving element 104 when removed from the track 106. The moving element 104 has the machine readable medium 120 on the extension 118. The machine readable medium 120 is detected/read by the sensors 122, 123 to determine the moving element's position as the moving element 104 travels along the track 106. This position feedback is then used to control the movement of the moving element 104. The moving element 104 has elements 124, such as permanent magnets, that interact with the stator armature 112 and coils 114 in the corresponding track section 102 to move along direction 126 of FIG. 1.

Figure 6A:
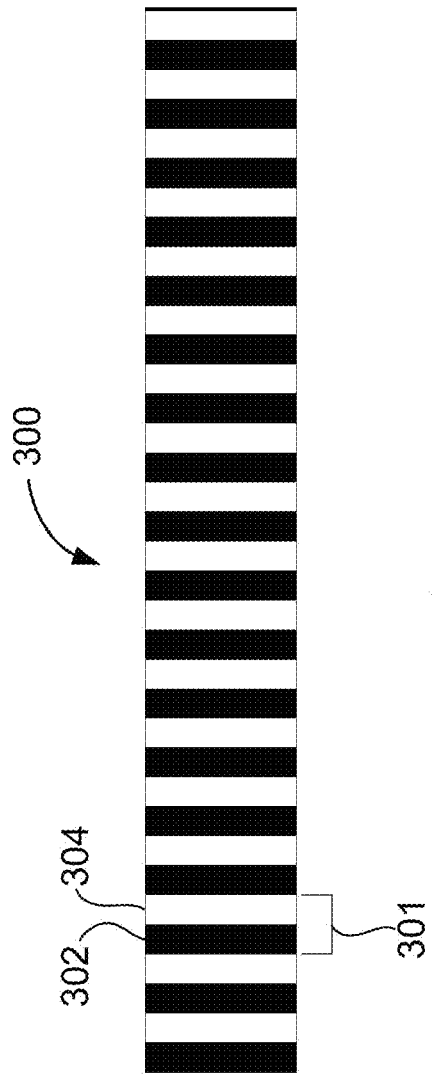
FIG. 6A is a machine readable medium having one channel.

FIG. 6A shows an example single channel magnetic machine readable medium 300 according to an embodiment. The machine readable medium 300 includes zones 301. In this case, each zone 301 includes a north pole 302 and a south pole 304 creating a magnetic sinusoidal pattern. For example, the zone 301 contains a 2 mm north pole 302 and a 2 mm south pole 304, for a total zone width of 4 mm. The sinusoidal pattern may be resolved into a 'zone count' value. In an example, the zone count may be any value between 0 and 4096; however, the quantity of zone count values within a zone width will depend on the magnetic resolution of the sensors and the machine readable medium. The sensors 122, 123 sense the zones 301 to determine the location of the machine readable medium 300 within a zone pitch. The zone pitch is the spacing of each zone 301 (for example, 4 mm). The zone count may be equated with a physical distance in the zone such that resolution of the zone count and the zone can provide a physical position of a moving element 104 in relation to the sensors 122, 123 providing the reading, which can then resolve to a position of the moving element on the track. In an example, each zone count value may be approximately equivalent to one micron in physical length along the zone.

In other embodiments, the zones may have other arrangements, for example, they may contain a different number of poles. For example, one zone may contain one north pole, one south pole, both a north and south pole, north-south-north poles, south-north-south poles, or north-south-north-south poles, or the like.

Figure 6B:
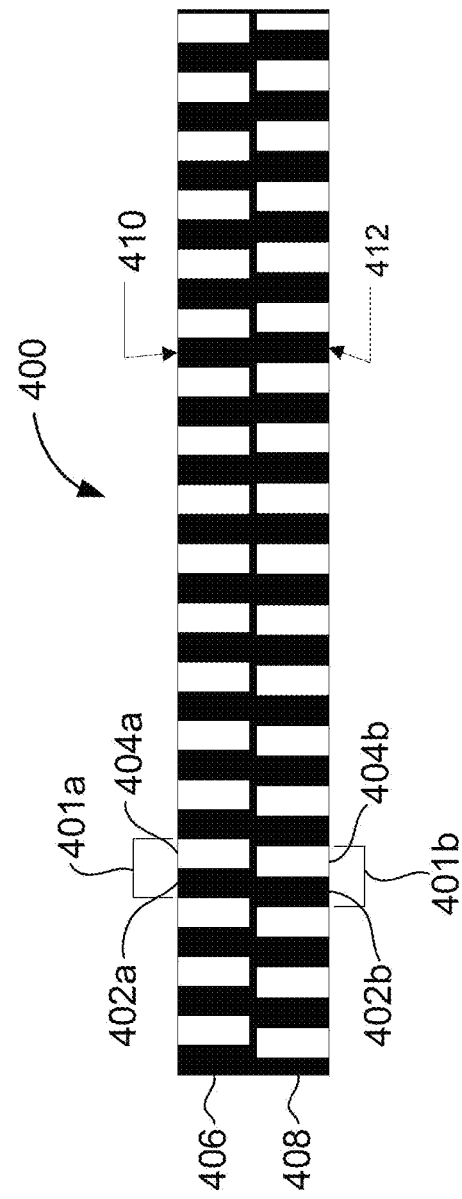
FIG. 6B is a machine readable medium having two channels.

FIG. 6B shows an example machine readable medium 400 with a first channel 406 and a second channel 408. The first channel 406 has first zone 401a with a first set of poles 402a, 404a at a first zone pitch 410 (for example, 4.0 mm) while the second channel 408 has a second zone 401b with a second set of poles 402b, 404b at a second zone pitch 412 (for example, of 3.9 mm). The size difference between the first zone pitch 410 and the second zone pitch 412 results in a phase difference between the zones 401a of the first channel 406 and the zones 401b of the second channel 408. This dual channel configuration 400, with zones 401a, 401b and poles 402a, 402b and 404a, 404b having a phase difference, is intended to provide position feedback and identification tracking of the moving element 104. In general, the dual channel machine readable medium 400 can be configured to provide more precise location information than the single channel machine readable medium 300.

In a dual channel machine readable medium system, the track section 102 may include the first sensor 122 and the second sensor 123. The first and second sensors 122, 123 can be offset from one another such that the first sensor 122 reads one channel and the second sensor 123 reads the other channel. Further, the second sensor 123 can be angled relative to the first sensor 122 to work with the phase difference. For example, the sensor 123 may be angled such that the 3.9 mm pitch reads like a 4 mm pitch. This offset is intended to allow sensor 123 to work with the sensor 122 in terms of readings. In an example, the sensor 123 may be angled such that the hypotenuse of the right angle triangle formed between the machine readable medium with the 3.9 mm pitch and the sensor 123 is 4 mm.

In embodiments where there are two channels 406, 408, the sensors 122, 123 may or may not be aligned with each other along direction 126 of FIG. 1 as the sensors 122, 123 read the machine readable medium. Where the sensors 122, 123 are not physically aligned, an offset can be incorporated when determining the phase difference.

Position feedback is provided by the sensors 122, 123 that are positioned along the track 106 to read both the first and second channels 406, 408 of the dual channel machine readable medium 400. At any given position, the first sensor 122 reads a value from the first channel 406 (for example, between 0-4095 in a 4.0 mm zone pitch) and the second sensor 123 reads a value from the second channel 408 (for example, between 0-4095 in a 3.9 mm zone pitch). The difference in the values read can be divided by the phase difference (for example, 0.1 mm) to determine the total phase shift between the readings. With this phase shift, the controller 200 can determine what zone or zones on the machine readable medium 400 the sensors 122, 123 are reading and thus the position of the moving element 104 on the track section 102. The system 100 may also combine the readings from multiple sensor pairs 122, 123 reading concurrently to provide a better accuracy than one sensor pair 122, 123 could provide on its own. The conveyor system 100 may also average, or the like, multiple readings to provide a higher resolution feedback than a single sensor pair 122, 123 could provide.

The phase difference can allow the controller 200 to determine which zone the two sensors 122, 123 are currently engaging with. Once the controller 200 knows which zone the sensors 122, 123 are engaged with, the controller 200 can determine the position of the moving element 104 relative to the sensors 122, 123. In this way, the sensor 122, 123 provides the position within a zone. The controller 200 initially determines which zone or zones the moving element 104 is located on the machine readable medium. For example, where the machine readable medium is a magnetic strip, the magnetic strip may have 36 zones and the controller 200 determines which of the 36 zones the sensor 122, 123 is over to determine the position of the moving element 104. Once the controller 104 has the zone for each channel 406, 408, the controller 200 can track the moving element 104 from then on.

Where the machine readable medium 400 has two channels 406, 408, a first channel 406 with zones 401a having a 4 mm zone pitch and a second channel 408 with zones 401b having a 3.9 mm zone pitch, if the machine readable medium 400 moves 2 mm through a given sensor 122, 123, such movement will cause the readings to increase or decrease by 2,048 counts depending on the direction of travel. The sensor 122, 123 may provide a 4096 count resolution over each zone. If either sensor 122, 123 crosses a boundary between zones, the position readings will either drop to 0 and increment up or jump to 4095 and decrement down depending on the direction of travel at the zone boundary.

The controller 200 may include calibration values for each sensor 122, 123 to compensate for system variability including variability due to tolerance stack ups or the like. In an example, the sensors 122, 123 read 0 to 4095 zone count values over each zone. A discontinuity may exist at the edge of each zone, where the counts jump from 0 to 4095 or 4095 to 0. The controller 200 can be configured to account for this discontinuity to avoid spurious results when determining which zones the sensor 122, 123 is reading. Accounting for this discontinuity may include, for example, disregarding the readings proximate to the edges of each zone, adding space on either side of the edges of the zone, or the like. The spurious result may be due to system variability resulting from factors such as calibration error, thermal expansion, and noise in sensor readings. As the spurious results may be greater at the extremes and less towards the center of the machine readable medium 400, the sensor readings may be biased towards the center of the machine readable medium when determining which zone the sensor 122, 123 is reading.

In some cases, two or more sensor pairs 122, 123 may be engaged with each channel 406, 408 of the machine readable medium 400 at the same time. It is intended that multiple sensor engagement may provide increased precision when determining the position of the moving element 104. The controller 200, having received zone readings from multiple sensors per channel, may use the readings in any appropriate manner to determine the position of the moving element 104. In one example, the reading closest to the center of the moving element 104 may be used.

FIG. 7A shows an example of a segment 500 of a dual channel machine readable medium that is configured to provide a unique identifier. The segment 500 has a first zone 502 and a second zone 504. The first zone 502 is out of phase from the second zone 504. The amount that the zones 502, 504 are out of phase, the phase difference, can be used in this embodiment to represent an identifier that is unique to each moving element 104. The identifier may be a unique identification number for machine readable medium 120 of the moving element 104 being read. The identifier may alternatively be a reference to a unique identification number. The reference can then be used by the controller 200 to call or look up the unique identification number. The identifier is read by the same sensors 122, 123 that read the position of the moving element 104. The unique identification number may be used for identification tracking of the moving element 104, or for pallets, fixtures, and products on the moving element 104.

FIG. 7B shows an example of a segment 510 of a dual channel machine readable medium configured to provide a unique identifier different from the segment 500 of FIG. 7A. The segment 510 has a first zone 512 and a second zone 514 out, of phase from each other. The phase difference is different from the phase difference between 502 and 504 in order to result in a different identifier.

Figure 8A:
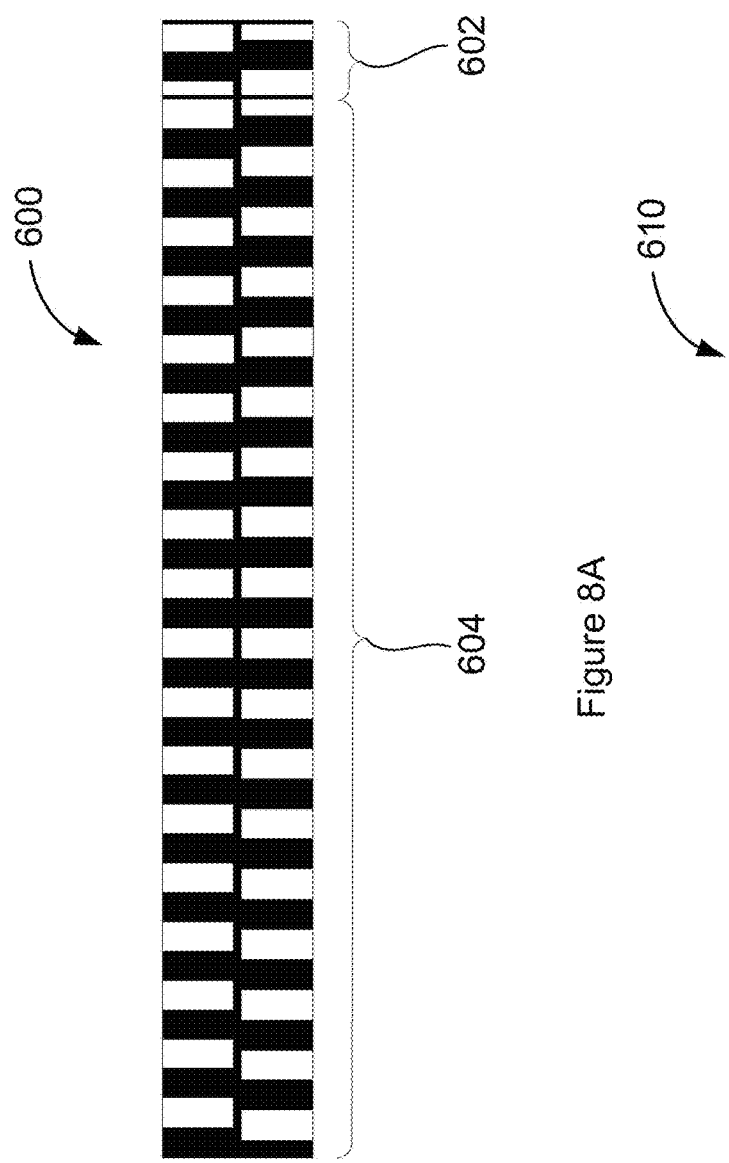
FIGS. 8A and 8B are machine readable media having an identification section and a position section.

FIG. 8A illustrates a machine readable medium 600 having an identification tracking section 602 (for example, as described with reference to FIG. 7A) and a position feedback section 604 (for example, as described with reference to FIG. 6B). In some embodiments, the same sensors 122, 123 and machine readable medium 600 configuration may be used for both identification and position. With the machine readable medium 600, the sensors 122, 123 reads the identifier from the identification tracking section 602 at the same speed that the sensors 122, 123 reads the moving element's position from the position feedback section 604. The identifier may be read while the moving element 104 is moving such that the moving element 104 does not have to stop at the sensors 122, 123. The identifier may be available at any sensors 122, 123 positioned throughout the conveyor system 100.

The controller 200 determines whether readings are from the identification tracking section 602 or the position feedback section 604 of the machine readable medium 600. Once the conveyor system 100 is initialized, the controller 200 keeps track of which section of the machine readable code the readings are coming from. In some cases, upon initialization, the moving element 104 may require a slight movement, generally in the range of 1-2 mm, to resolve any uncertainty about whether the sensors 122, 123 are reading an identification tracking section 602 or a position feedback section 604. In further cases, the slight movement may also or alternatively be used to determine whether a sensor 122, 123 is reading a value on the fringe of a machine readable medium 600 which may be causing the reading to be invalid.

With the machine readable medium 600, there is no additional tag or label required as identification is built into the positioning system. There is no need to mount additional machine readable media to the moving element 104 and the same sensors 122, 123 used for tracking position are used to read the unique identifier. No additional hardware may be needed.

Figure 8B:
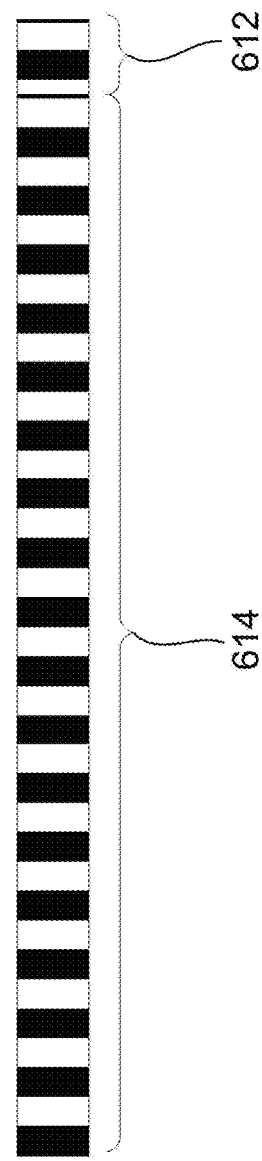

FIG. 8B shows a machine readable medium 610 having an identification tracking section 612 and a position feedback section 614. The machine readable medium 610 has one channel. In this embodiment, general position feedback is provided from a sensor 122 sensing the position feedback section 614, while the sensor 123 senses an identifier from the identification tracking section 612. The controller 200 compares the position feedback section 614 and the identification tracking section 612 to determine the identifier. In some cases, after the conveyor system 100 has been initialized, the controller 200 keeps track of whether a sensor 122, 123 is reading the position feedback section 614 or the identification tracking section 612. As the moving element 104 is at a known position in the position feedback section 614, the controller 200 may read the identification value from the identification tracking section 612. The identification value may be set based on the location of the identification tracking section 612 relative to the position feedback section 614.

In some cases, a zone finding scheme may need to be implemented upon initialization. In a basic example, the moving element 104 may be moved until the sensor 122, 123 passes the end of the machine readable medium 610. The moving element 104 may then be moved such that the sensor 122, 123 passes over the machine readable medium 610. The sensor 122, 123 can then detect the edge of the machine readable medium 610. The controller 200 may then use zone counts, or the like, to track the moving element 104 during operation. At that point, the position feedback section 614 may be used for determining position and the identification tracking section 612 may be used to determine identification.

One of skill in the art will understand that other methods of initialization may be available depending on the number of channels and the like, including those involving smaller movements of the moving element such as taking a reading and predicting subsequent readings then moving slightly to determine if the predictive subsequent readings were correct and the like.

In some cases, the machine readable medium 600, 610 may include extra space on either or both sides of the machine readable medium 600, 610 to allow for spurious readings or the like. In an example, where the identification tracking section 602, 612 zones are 4 mm in length, the identification tracking section 602, 612 zones may be 6 mm in length in order to include a 2 mm buffer at the edge of the zones.

Figure 9:
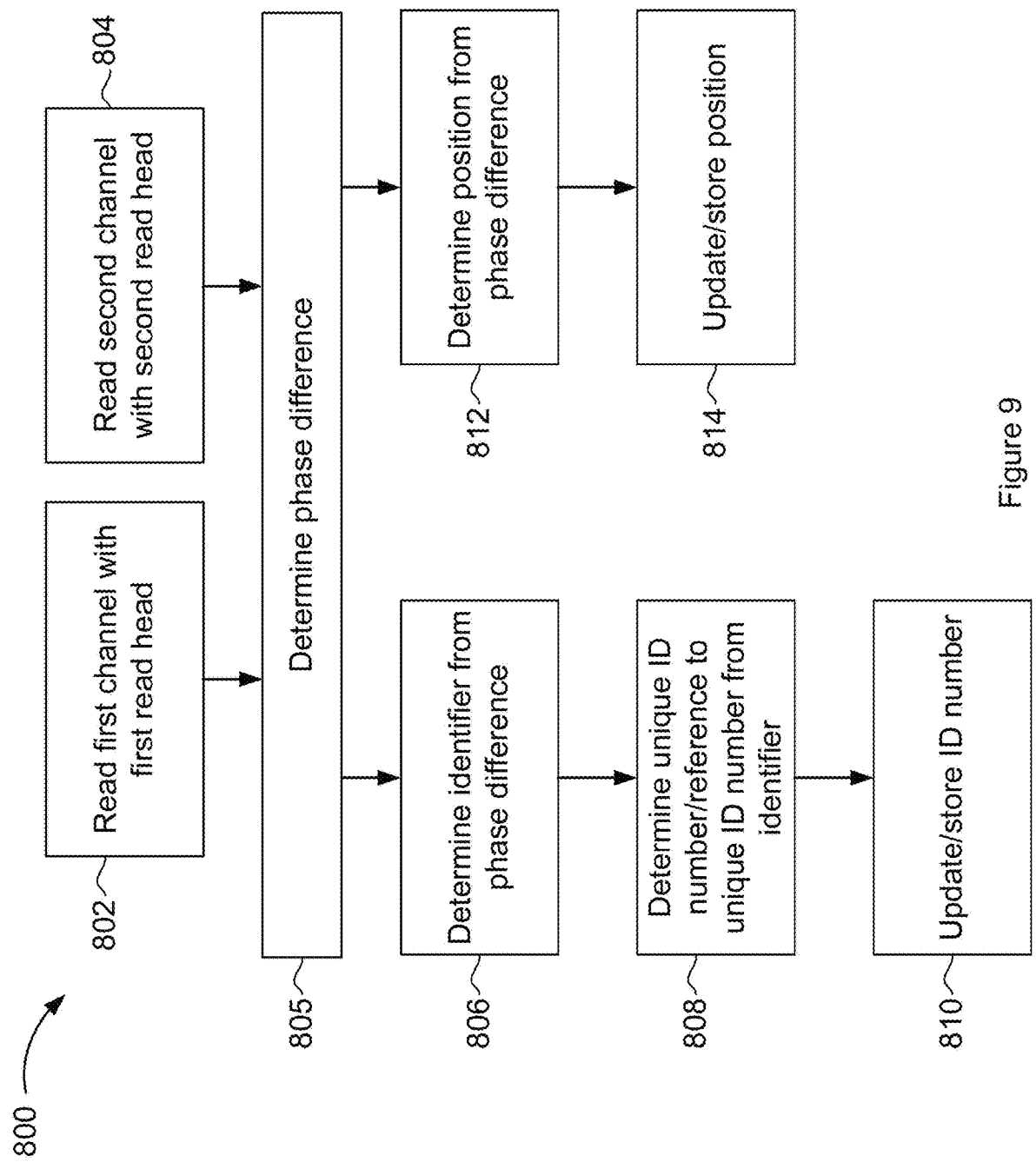
FIG. 9 is a flow chart of a method for tracking a moving element.

FIG. 9 illustrates a method 800 for tracking a moving element in a conveyor system, in accordance with an embodiment. Initially, at 802, a first sensor reads a first channel of a machine readable medium. At a similar or parallel timing, at 804, a second sensor reads a second channel of the machine readable medium. At 805, a controller determines a phase difference.

The controller determines an identifier from the phase difference at 806. At 808, a unique identification number and/or a reference to a unique identification number is determined from the identifier. The controller is updated at 810 with the identification number of the moving element.

With similar or parallel timing, at 812, the controller determines which zone each sensor 122, 123 is reading from the phase difference and determines the position of the center (or other point) of the moving element 104 based on the known location of the sensor pair 122, 123 and the determined zone or zones of the machine readable medium 600, 610. At 814, the conveyor system controller is updated with the position of the moving element.

The encoder strips described above have involved a black and white encoder or encoder strip. In another embodiment of a system for tracking a moving element, there is provided an encoder that makes use of a color gradient to allow for more resolution and accuracy in determining position of the moving element. In particular, the system uses a color gradient strip and color sensor to automatically determine where each moving element/pallet is located on a track at start-up. In a particular example, for a magnetic encoder strip, there may be approximately forty 4 mm magnetic zones on a typical track section and it is helpful to automatically determine in which zone a moving element is located. The approach described herein of determining moving element position by comparing readings from magnetic zones may be made more accurate, particularly for curved sections, by using a color gradient approach. This color gradient approach can also aid in tracking moving element ID.

FIG. 10 illustrates readings that are taken by a sensor using a color gradient. In this case, FIG. 10 is a scan of a red gradient of RGB values from 0x30 to 0xD0 along approximately 150 mm generated by a conventional inkjet printer on photo gloss paper. FIG. 11A illustrates a color gradient encoder strip 1100 such as that used for this test (not to scale) as well as a potential zone for tracking a moving element ID. The scanner used was a VISHAY™ VELM6040 scanner. As can be seen in FIG. 10, readings are quite linear and range from about 15,000 to 60,000 over the 150 mm run, which was divided into groups with an average of 50 readings in a group, which provides about 300 counts/mm. Also included (illustrated along the bottom of the graph) are bars showing the standard deviation and span (max-min) of each group, both of which were negligible. It will be understood that the color gradient can be formed of various colors, including black and white or grey scale. Further, the color encoder strip and color sensors may extend beyond the visible spectrum.

As shown in FIG. 11A and in more detail in FIG. 11B, the ability to read a moving element ID can be introduced via reliefs that can be machined into an encoder strip segment/bracket. For example, ID bit locations can be 4 mm in width and 2 mm in height with their locations symmetrical about the center of the segment. The width or depth can be adjusted as necessary for particular applications or to obtain appropriate accuracy. As an example of number of locations, there could be a total of 23 consisting of 16 ID bits and 7 checksum bits. With each location spanning 4 mm, this type of ID region would total 92 mm in length.

Figure 12:
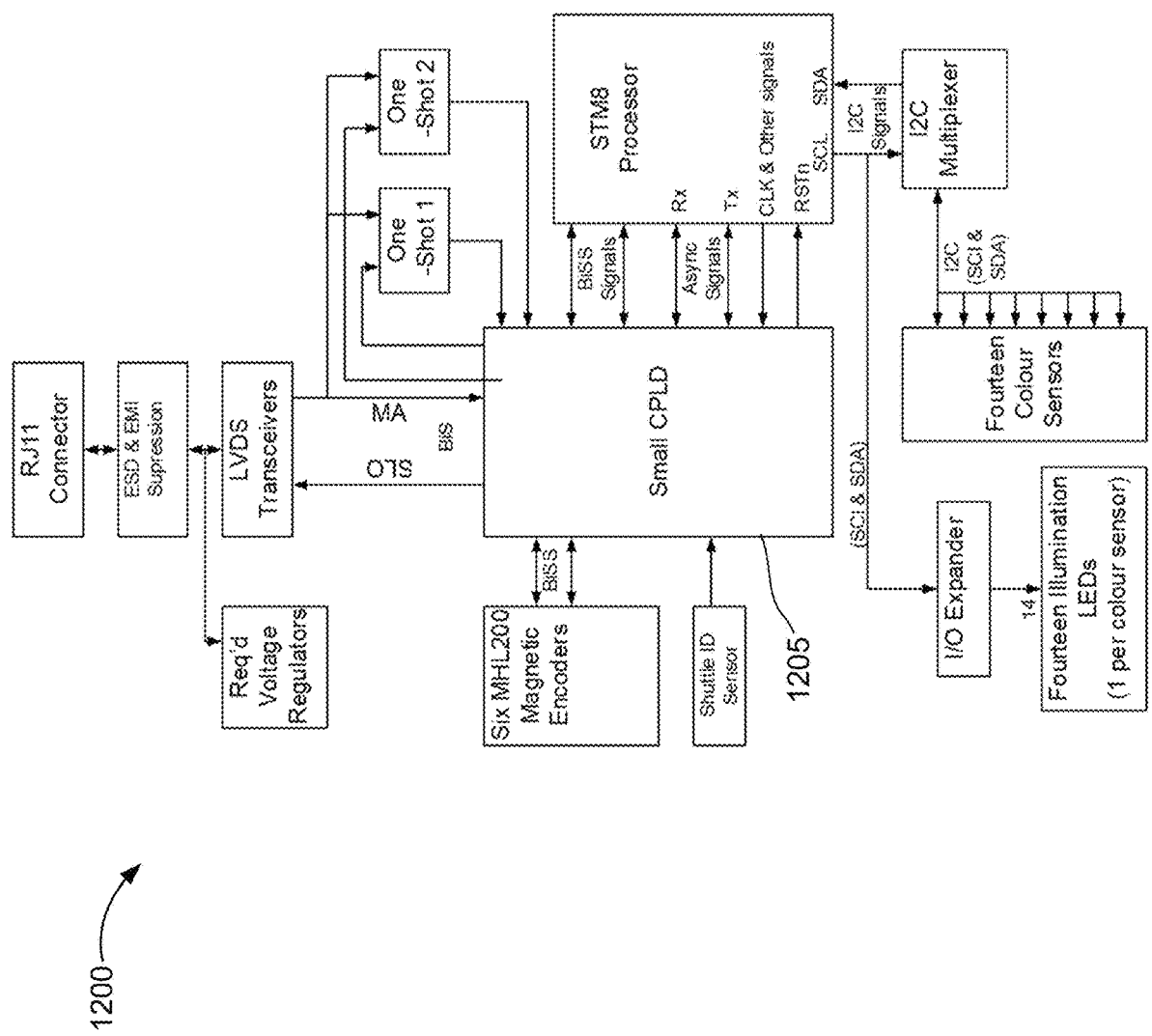
FIG. 12 illustrates a circuit diagram for a system for tracking a moving element according to an embodiment herein.

FIG. 12 illustrates an example circuit 1200 for an embodiment of the system for tracking a moving element. It will be understood that various other circuits can be used depending on the type of encoder strip, sensors and the like. In this example, the circuit 1200 works with a track section having a plurality of (in this case 6) magnetic sensors/encoders for tracking moving elements as described above. In this case, the circuit 1200 includes a complex programmable logic device (CPLD) 1205 and communications between a track section gateway and the circuit pass through the CPLD. The CPLD can be used to switch between Bi-directional serial synchronous (BiSS) and asynchronous communications modes, for example by transmitting either an extended high on the MA signal line (to select BiSS mode), or an extended low (to select asynchronous mode). The length of this extended period can be configured/defined but may be greater than 16 usec.

In BiSS mode, the MA and SLO signaling to and from the six magnetic encoder IC's, simply pass from the LVDS transceivers straight through the CPLD to the six magnetic encoders. Since there are now only six versus the original eight encoder ICs found on an encoder board such as described above, data burst coming from them will be some 42 bits (8 MHz MA clock cycles) shorter allowing other operations to be performed.

Each 'sweep' of the encoder ICs results in these encoder ICs serially transmitting their information to the gateway over the SLO line synchronous with the clock being received over the MA line. After transmission of the last bit, the SLO line is driven low and will stay low (even if additional MA clock cycles are received). The MA line is then paused, in either a high or low state. The magnetic encoders sense this static condition and after their timeout period (typically 2 usec but programmable) they latch in the state of the MA line and drive the SLO line high to signal they have timed out and are ready to be swept again.

A pair of one-shots is present to monitor the activity on the MA line. One-shot 1 detects the relatively short loss of MA during the magnetic encoder timeout interval. The other, one-shot 2, detects the longer loss of MA when switching between BiSS and asynchronous modes.

A gateway FPGA code sweeps the encoders 32 times in every 800 usec machine cycle (an average of once every 25 usec). To transmit rapid updates on the status of the moving element ("shuttle") ID sensor the CPLD uses the signal from one-shot 1. If one-shot 1 times out, the CPLD hijacks the MA and SLO lines by holding both the MA line to the magnetic encoders and the SLO line back to the gateway in a high state. It then waits the first clock cycle (a falling edge) that will eventually occur on the MA line. Synchronous with this, it will output the state of the shuttle ID sensor and then re-enable the BiSS signaling path. In essence, this uses the first MA clock cycle in order to transmit the shuttle ID sensor status. With this approach, this sensor will be read, on average, every 25 usec. At a shuttle speed of 4 m/sec (4 mm/msec) a 4 mm long shuttle ID bit would be sampled some 40 times. Assuming the sensor itself has a rapid response; shuttle IDs can be read at full shuttle speed.

In asynchronous mode, communication between the gateway FPGA and the encoder board STM8 processor may be in a standard asynchronous format (or a variation thereof) over the MA and SLO signal paths. The data rate can be determined based on the equipment or needs of the system. Asynch mode can be used to control the color sensor illumination LEDs, configure and access the I2C multiplexer, and through it, the color sensor ICs (which are I2C devices in this case) and the like. The command set may include the following type of commands:

select which sensor to access through the I2C multiplexer.

configure the color sensors (in this example, there are eight).

trigger a color integration and read data from sensors when the integration is complete.

enable/disable each color sensor illumination LED.

request the version of code running in STM8 processor as well as the board version.

The hard core 120 within the processor can be used for communications between it and the I2C devices connected to it. Note that the processor may have internal flash memory that automatically boots at power-up.

In this embodiment, it is helpful if there is backwards compatibility with encoder solutions such as the one described above and/or earlier encoder formats. It should be noted that color sensing can be a slower process and, as one example, could require 100 ms or more to obtain a reading. This is really not an issue as this sensing will generally be performed when the moving elements/shuttles are stationary and the color sensing is being conducted to locate them (i.e. determine their current 4 mm magnetic zone). An embodiment of a method for locating shuttles could include:

select a color sensor (with its illumination LED off).

trigger that sensor to perform integration.

read data from the sensor. This data could either be from what's reflected from a color strip (if a shuttle is over the sensor) or from the ambient area above.

enable the sensors illumination LED.

trigger that sensor to perform a second integration then disable its illumination LED.

read data from the sensor. Again, this data could either be from what's reflected from a now illuminated color strip or from ambient.

Examination of the two above readings, or sets of readings (both unlit and lit), will allow the system to determine if the sensor is viewing a color strip and, from that, at which 4 mm magnetic strip zone the shuttle is located. This process can be run in parallel or series for all sensors.

In some cases, while the above method is being performed a user will be able see a series of brief flashing red LEDs wherever shuttles are not present. Assuming an integration time of 200 ms, each sensor on a section could be scanned within a half a second (its associated LED would be on for about half this time). All eight sensors (in this example) on an encoder board, if processed in series, could, in theory, be scanned within four seconds (likely much less if sensor integration times are overlapped or parallel). By simultaneously scanning all encoder boards, left and right on all sections, all shuttle locations can be determined machine wide within this time.

To reduce or minimize power consumption, the illumination LEDs could be configured to not be illuminated when in BiSS mode. While in async mode only those LEDs actually required may be illuminated. In some cases, the shuttle ID reader may use an IR LED (not visible), and it can be configured to only be illuminated when shuttle ID reads are being performed.

In some cases, the color gradient strip and associated region of the bracket can be shortened to reduce or prevent curved profile push-off.

Generally, the color sensors can be evenly distributed over the length that each encoder board covers (in one example, each board covers 500 mm and, with eight sensors, each sensor is placed about every 62.5 mm). In this case, if the color gradient strip can be 130 mm in length or longer such that two color sensors can always be under a strip.

FIGS. 13A and 13B illustrate another embodiment of a system for tracking a moving element. In this embodiment, the tracking makes use of either a dual-channel encoder strip 1300a (FIG. 13A) or a trailing encoder strip 1300b (FIG. 13B) (sometimes an encoder strip is referred to as a "nonius"). In this case, rather than having two channels, a primary strip and secondary strip are arranged in series, each with different pitch.

Generally speaking, in this embodiment, it is intended that primary and secondary strips are about half the length of an encoder strip as discussed above, and the sensor pitch is also half, so that the same sensor coverage is available to embodiments discussed above (i.e. 1-2 sensors per primary strip). It is further intended that, with a single line of encoder sensors, the encoder strips can be made wider, for greater forgiveness on corners/turns (this is intended to prevent sensors encountering the side of the strip). Still further, primary and secondary patterns should be able to be made in a single strip, for greater accuracy and alignment. Even further, with half as many poles per primary strip the "nonius resolution" could be doubled, allowing the deviation per division to be twice as much before it wraps around (in a similar example to that above, to provide an aliasing condition at 62.5 mm, rather than 125 mm). In this example, this may allow for a secondary strip pitch of 4.2 (or 3.8). Lastly, on startup, determination of what is a moving element/shuttle would follow similar logic as in the above embodiments (but using a single line of sensors vs two). The front sensor (assuming a left to right travel) of a moving element/shuttle will be on the primary strip. The last sensor on the moving element/shuttle will be on the secondary strip. In some cases, the middle sensor (if present) could be on either strip, and can serve as a redundant check.

The goal is that having a single encoder strip (vs 2 strips offset radially (when on a corner/turn) from one another) would reduce issues of tracking on corners/e-turns and the encoder sensor can read a pole pitch of slightly less than 4 mm, without needing to rotate the sensor (e.g. to 13 degrees) to match the pitch. Alternatively the sensor can read a pole pitch of slightly more than 4 mm, if briefly having 3 transitions on the sensor is an issue. Based on a sensor datasheet, deviations in pulse positions can be calibrated out, suggesting the signal will be intelligible even if the strip pole pitch is not exactly 4.0 mm (and not rotated to match). In some cases, there may need to be a clear indication of the location of the transition from primary to secondary pattern, for sensing purposes.

Figure 14A:
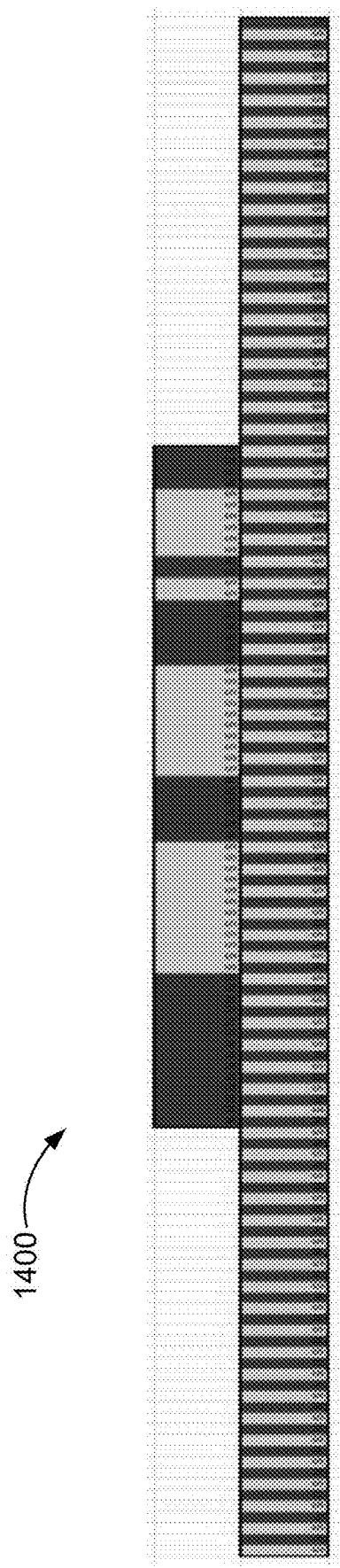
FIGS. 14A, 14B, and 14C illustrate another embodiment of a system for tracking a moving element.
Figure 14C:
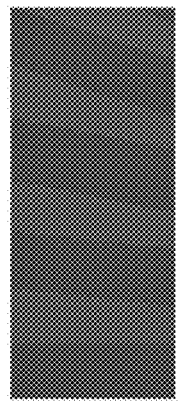
Figure 14B:
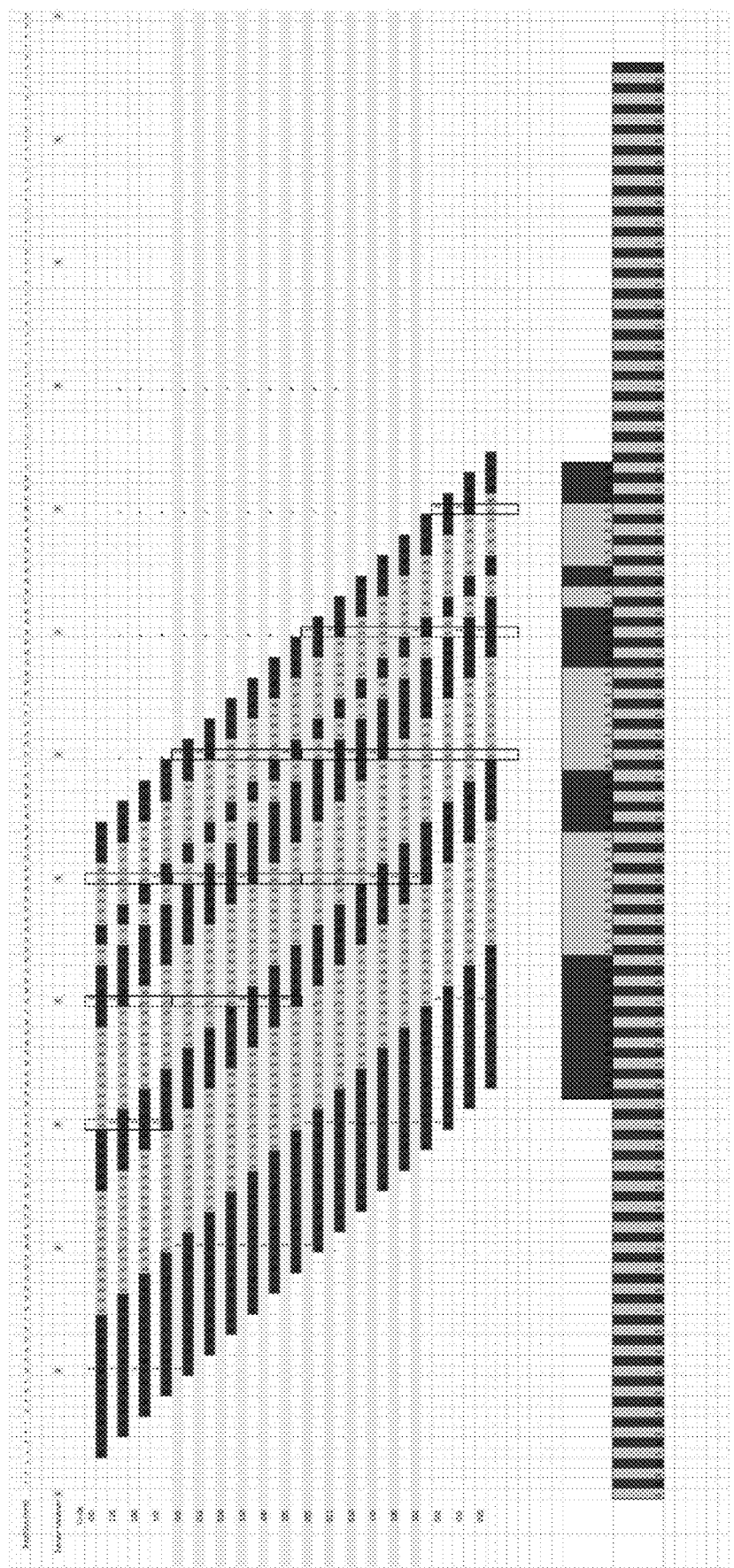

FIGS. 14A, 14B, and 14C illustrate another embodiment of a system and method for tracking a moving element. In this case, embodiments of the system and method are intended to give absolute position on both straight track sections and curved track sections using a magnetic encoder strip 1400. In general, these embodiments are configured to use an encoder with a single track scale as illustrated in FIG. 14A. In this embodiment, the encoder sensors may be magnetic (Hall effect) sensors and with the Hall effect sensors spaced appropriately. In an example similar to those above, the Hall effect sensors may be spaced at about 12 mm. The arrangement may also use a quasi-Gray code at less than half the length of a moving element/shuttle as shown in FIG. 14A. In FIGS. 14A, B, C, darker/red color represents North polarity and lighter/green color represents South polarity. It will be understood that polarities could also be opposite if appropriate. In this arrangement, it can be determined if five sensors in a row are off, and this will indicate that the moving element/shuttle is in a gap. From the gap, the system can look to the right to find the first sensor that is on. The system then sets this sensor as the master position unless the next sensor is on as well, in which case the second "on" sensor becomes the master. From the master, the next sensor moving right will always be off, and then the system can interrogate the next three sensors. These sensors should produce the following code as the pallet moves through a predetermined distance (such as 12 mm or the like):

001
011
010
110
100
101

In this sequence only one bit changes state at the same time (this is the principle of a quasi-Gray code encoder). FIG. 14B illustrates this effect. In this embodiment, the sensor pitch (physically 12 mm) is thus subdivided into 12/6=2 mm increments. Even with some sensor triggering uncertainty and some sensor position error, this approach is intended to give a position reliably within a 3 mm window, which will allow the system to determine which 4 mm period of the encoder the moving element/shuttle is in, for example, at the conveyor system start up or the like. The shorter length of the encoder strip also helps to keep effectiveness and accuracy on curves. Further, since the encoder strip is a single track, geometry can be used to assist with calculations and effectiveness on curves, as illustrated in FIG. 14C.

On a circuit board, similar to that described above, there could be an encoder chip such as described above, and then a series of Hall effect sensors on either a 12.5 or 10 mm pitch. In some cases, the strip may also include a designated location for moving element/shuttle ID such as described above or the like. Further, in some cases, it may be possible, to increase the density of the sensors and encode ID on the same line.

It will be understood that, while the moving element 104 is called a moving element, the moving element 104 need not be moving to give a reading to the sensor 122, 123. Rather, the 'moving' in moving element refers to the ability of the moving element to move over the track section 102.

The sensors 122, 123 are intended to be robust while they are being used in the control of the moving elements 104. The conveyor system 100 may use the same or similar hardware for the unique identifier. Where the conveyor system 100 described herein is used to operate an assembly line, the robustness may be advantageous because the conveyor system 100 is intended to operate consistently without faults.

It is also noted that elements of each of the embodiments above can be used with elements from other embodiments where appropriate. For example, a color gradient encoder system can be used with a magnetic encoder system, either with or without a quasi-Gray code implementation. Each of the types of encoder strips/systems may be configured as dual-channel in parallel or in series (i.e. primary and secondary, as noted above) and may include moving element identification as well as location/position tracking.

Further, the tracking (location, position while moving and identification) described herein may be applied beyond a linear motor conveyor to any appropriate type of conveyor or transport system, for example, a conventional belt-type conveyor. For example, a pallet in a belt-type conveyor could be provided with a machine readable medium 600, 610 and a workstation associated with the belt-type conveyor could be provided with a sensor pair 122, 123 such that, as the pallet passes or is stationed at the workstation, the position of the pallet relative to the workstation and the ID of the pallet could be determined from the sensor readings.

In the preceding description, for purposes of explanation, numerous details are set forth in order to provide a thorough understanding of the embodiments. However, it will be apparent to one skilled in the art that these specific details may not be required. In other instances, well-known structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A system for tracking a location of a moving element on a conveyor system, the system comprising:
    a plurality of magnetic sensors;
    a magnetic encoder strip that is readable by the magnetic sensors;
    a second magnetic encoder strip that is also readable by the magnetic sensors, wherein the second magnetic encoder strip is configured to be approximately half the length of the magnetic encoder strip and to use a quasi-Gray code;
    a plurality of color sensors;
    a color gradient encoder strip that is readable by the color sensors; and
    a processor for receiving and processing the magnetic sensor and color sensor readings to determine a location of the moving element on the conveyor system,
    wherein the color gradient encoder strip and color sensors provide moving element location at start up and the magnetic sensors and magnetic encoder strip track moving element location during operation.

2. A system for tracking according to claim 1, further comprising an illumination light emitting diode (LED) lighting an area associated with one or more of the plurality of color sensors and wherein the processor is configured to turn the illumination LED on and off.

3. A system for tracking according to claim 1, wherein at least one of the magnetic encoder strip and the color gradient encoder strip comprises a primary and a secondary encoder strip arranged in series and each of the primary and secondary encoder strips have different pitch.

4. A system for tracking according to claim 1, wherein at least one of the magnetic encoder strip and the color gradient encoder strip comprises a moving element identification section and a position tracking section.

5. A system for tracking according to claim 1, wherein the magnetic sensors are Hall effect sensors.

6. A system for tracking a location of a moving element on a conveyor system, the system comprising:
- a plurality of magnetic sensors;
- a magnetic encoder strip that is readable by the magnetic sensors;
- a second magnetic encoder strip that is also readable by the magnetic sensors, wherein the second magnetic encoder strip is configured to be approximately half the length of the magnetic encoder strip and to use a quasi-Gray code; and
- a processor for receiving and processing the sensor readings to determine a location of the moving element on the conveyor system.

7. A system for tracking according to claim 6, wherein at least one of the magnetic encoder strip and the second magnetic encoder strip comprises a moving element identification section and a position tracking section.

8. A system for tracking according to claim 6, wherein the magnetic sensors are Hall effect sensors.

\* \* \* \* \*